Oct. 14, 1924.                                                    1,511,499
                          W. M. BORGAL
              TREAD ATTACHMENT FOR VEHICLE WHEELS
                 Filed June 18, 1920            2 Sheets-Sheet 2
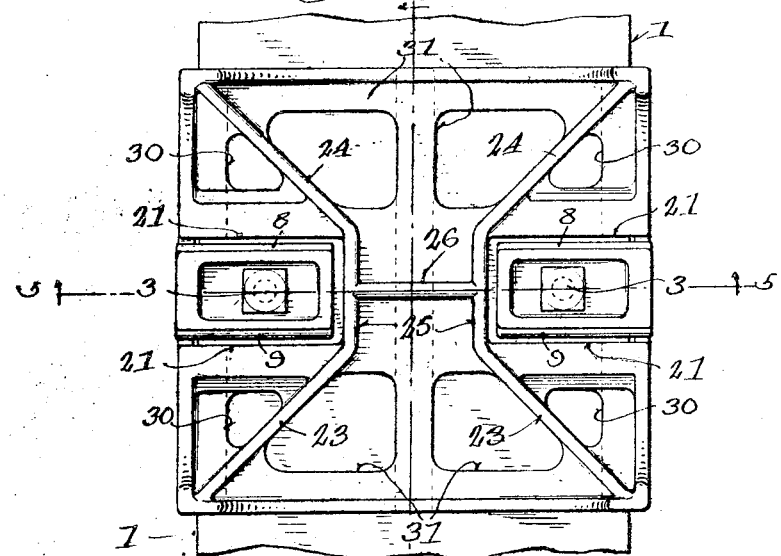
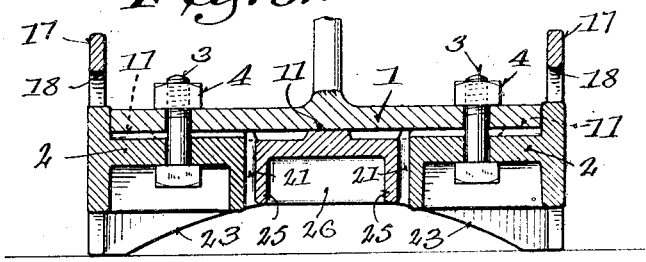
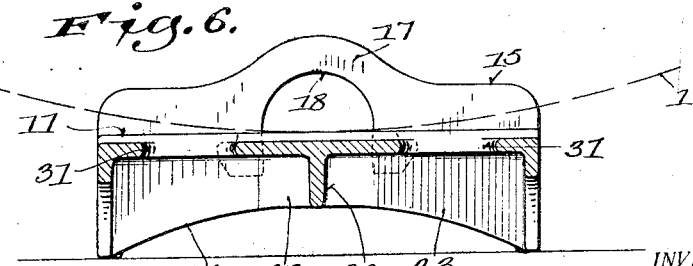
INVENTOR.
Wilbert M. Borgal
BY
Erwin Wheeler & Woodard
ATTORNEYS.

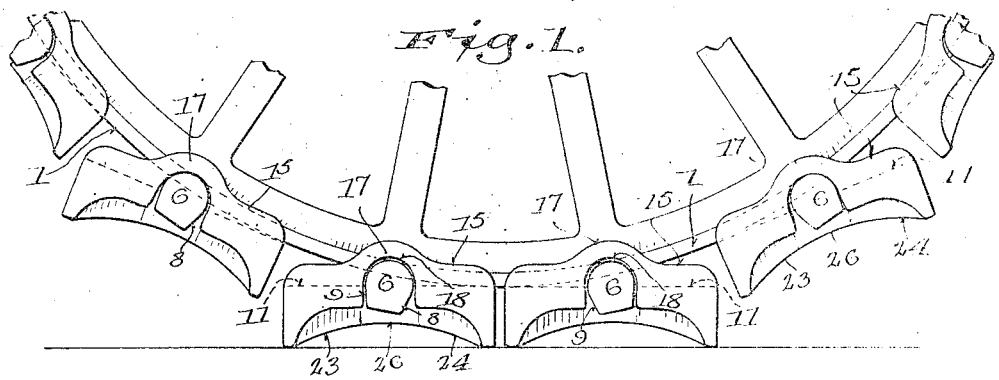
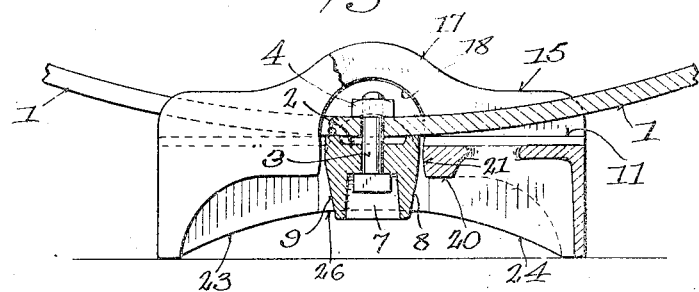
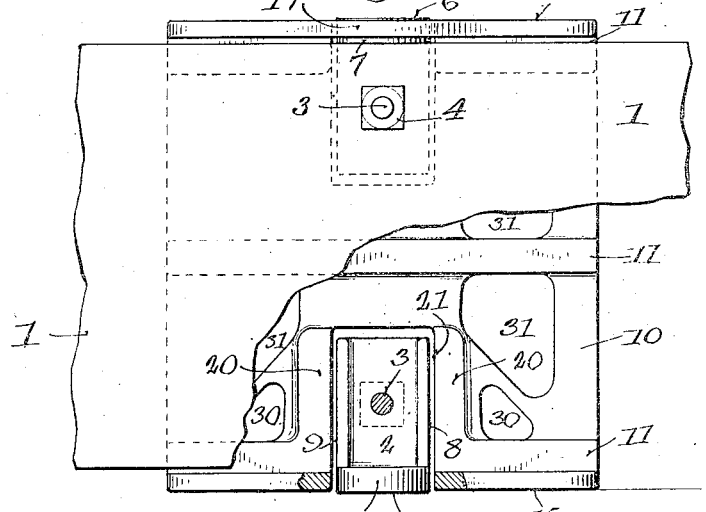

Patented Oct. 14, 1924.

1,511,499

UNITED STATES PATENT OFFICE.

WILBERT M. BORGAL, OF MILWAUKEE, WISCONSIN, ASSIGNOR OF ONE-HALF TO FRANK E. McINTYRE, OF MILWAUKEE, WISCONSIN.

TREAD ATTACHMENT FOR VEHICLE WHEELS.

Application filed June 18, 1920. Serial No. 389,967.

*To all whom it may concern:*

Be it known that I, WILBERT M. BORGAL, a subject of the King of Great Britain, residing at Milwaukee, county of Milwaukee, and State of Wisconsin, have invented new and useful Improvements in Tread Attachments for Vehicle Wheels, of which the following is a specification.

My invention relates to improvements in tread attachments for vehicle wheels, and particularly to attachments for traction wheels.

The object of my invention is to provide a form of attachment adapted to be readily attached in an annular series to any ordinary metallic rim; to provide means for so connecting the attachments to the rim as to permit each to come to rest in a substantially horizontal position on the ground, or in a position of conformity with the surface of the ground, before receiving the load; to provide a form of construction in which the spaces between the tread plate and wheel, and between the ground gripping flukes, will not become clogged with mud or sticky soil in such a manner as to materially interfere with successful operation; to provide for lifting the attachment after the load has moved to the next in the series; to provide a form of construction in which cramping effects will be avoided, side slipping or shifting movements prevented, and in general to provide a strong, durable and effective series of attachments, which will furnish a smooth trackway along which the wheel rim may freely roll without shock or strain and without becoming deeply embedded in any ordinary soil over which a vehicle may be propelled.

An embodiment of my invention is shown in the drawings, in which—

Fig. 1 is a side view of a fragment of a vehicle wheel equipped with my improved tread attachments.

Fig. 2 is a similar view, on an enlarged scale, showing one of the attachments partly in section to expose one of the connecting bolts, one of the tracks upon which the wheel rim travels, and one of the apertures thru which soil or other material may be forced by the pressure of the wheel rim.

Fig. 3 is a plan view of the parts shown in Fig. 2 with the wheel rim partially broken away.

Fig. 4 is a view of one of my improved tread attachments as seen from the under side in its relation to the wheel rim, a fragment of which is illustrated.

Fig. 5 is a sectional view drawn on the line 5—5 of Fig. 4.

Fig. 6 is a sectional view drawn on line 6—6 of Fig. 4.

Like parts are identified by the same reference characters throughout the several views.

The wheel rim 1 is illustrated as a metallic rim of ordinary type having a smooth surfaced cylindrical periphery near each side margin. A set of connecting members 2 are secured to the rim in an annular series along each side margin by bolts 3, the heads of which are received in recesses in the connecting members. The bolts pass through apertures in the wheel rim and are secured thereto by nuts 4 in clamping relation to the inner surface of the rim.

Each of the connecting members 2 projects laterally from the associated side margin of the rim and is provided with a flange 6 which projects inwardly toward the axis of the wheel and is provided with an arcuate bearing surface 7. The side faces 8 and 9 of the members 2 preferably converge outwardly from the rim and at the laterally projecting ends of the members 2, these surfaces 8 and 9 constitute continuations of the bearing surfaces 6 in flat converging planes. The connecting members 2 are of course symmetrically disposed and spaced at uniform distances from each other along the outer surface of the wheel rim, and serve as a means for attaching the tread plates now to be described.

Each of the tread plates 10 has one surface provided with trackways 11 which preferably comprise integral flat surfaced ribs or flanges upon which the wheel rim 1 may travel with a rolling motion, this surface of the tread plate constituting the inner surface, or surface opposed to the wheel rim, when the tread plate is in position for use. On this inner side of the tread plate and along its lateral margins, flanges 15 are provided, between which the wheel rim 1 may be received, the distance between the flanges 15 being slightly greater than the width of the rim. A central portion of each flange 15 is in the form of an arch 17 having a curved bearing surface 18 conforming generally to the curvature of the bearing surface 7 on the projecting portion 6 of the connecting member.

At the respective ends of each arch 17 abutments 20 are provided which consist of thickened portions of the plate 10 extending transversely of the rim and having bearing surfaces 21 opposing the connecting members 2 and their extensions 6. These bearing surfaces 21 diverge outwardly from the rim and from the surfaces 8 and 9 of the connecting members. The opposing surfaces 21 and 8 (or 9) are in close proximity in the plane of the plate 10, but are normally at a sufficient distance from each other to allow a slight independently shifting movement of the plate 10 relatively to the rim 1 along the outer surface thereof whereby the plate may freely accommodate itself to irregular surfaces without developing cramping strains on the connecting bolts 3.

The outer surface of each plate 10 is provided with ground gripping flukes or flanges 23, 24, 25 and 26, the flanges 23 and 24 extending obliquely from the respective corners of the plate and the flange 26 transversely of the rim and the plate. The flanges 25 extend longitudinally of the rim and serve not only to prevent lateral skidding but also as a protection for the connecting members or blocks 2. The arrangement of the various flanges is such that the connecting members or blocks 2 are wholly relieved from transverse strains and pressures upon the roadway, even in the use of the wheel as a driving wheel for the vehicle.

On both sides of the flanges 23 and 24 and between the track rails 11, I preferably provide the plate 10 with apertures 30 and 31 thru which material from the roadway may freely pass in such a manner as to prevent the spaces between the ground gripping flanges 23 to 26 inclusive, from becoming packed with sticky material, such as moist clay, and whereby material lodging on top of any plate 10 which is in contact with the ground may be pressed thru the apertures and the trackways 11 kept clear of such material.

The trackways 11 are so located with reference to the arch 17 that when the wheel is supported upon any given attachment the bearing surface 18 of the arch 17 of that attachment will be materially separated from the bearing surfaces 7 of the connecting members, as best shown in Fig. 2. The distance between the side faces 8 and 9 of the connecting members and the surfaces 21 of the abutments of the arches will also be sufficient to allow the wheel rim to travel along the trackways 11 with a free rolling motion, no cramping strains being imposed upon the bolts 3, but when the bearing line of the wheel rim reaches the ends of the trackways at the margin of any given plate 10, the plate will be tilted, and as the load shifts to the next plate in the series, the connecting members 2, associated with the first mentioned plate, will travel upwardly until their bearing surfaces 7 engage the surfaces 18 of the arches 17, whereupon such plate 10 will be lifted from the ground during the continued forward movement of the wheel. Each successive plate on the descending side of the wheel will be permitted to come in contact with the ground and rock into conformity with the surface thereof preparatory to the transfer of the load thereto, this being possible owing to the distance of the surfaces 18 of the respective arches 17 above the bearing surfaces 7 when the attachment is in load supporting position or in a position to receive and support the load.

It will be apparent that any soil which pushes upwardly thru the apertures 30 and 31 or which is forced between the rim and the plate 10 at the front and rear margins of the plate, will be driven outwardly by the pressure of the wheel rim as the latter rolls across the plate from one side to the other. The tracks 11 being narrow, the soil will be pressed from them and pushed forwardly across the front parts of the plate and also thru the apertures 30 and 31. That portion of the soil which is pushed thru the apertures 30 and 31 will disengage any sticky material which tends to pocket between the ground gripping flanges in such a manner as to prevent adhesion with any degree of permanency, the material dropping out from between the flanges when the attachment is lifted from the ground.

The connecting members 2 are secured to the respective margins of the rim in pairs, one member of each pair constituting also a member of the annular series along the margin of the rim to which it is attached owing to the fact that the connecting members are located between the abutments 20 which are substantially parallel with their side faces. Each connecting member may be secured to the rim by a single bolt which cooperates with the rounded portion of the projection 6 projecting across the margin of the rim and therefore preventing the connecting member from turning upon the bolt or about the axis of the bolt, but even in cases where this rounded portion of the projection 6 does not actually contact with the margin of the rim, the abutments 20 will prevent any material turning or shifting movement of the connecting member about the axis of the bolt.

It will be observed in Fig. 1 that when the load imposed upon the tread plates by the wheel is shifted from one tread plate to the next, the rounded surfaces 7 of the connecting members will be in close proximity to the bearing faces 18 of the respective arches.

Therefore, a continued movement of the wheel in either direction from its position as indicated in Fig. 1 will cause one tread plate to be lifted simultaneously with the separation of the connecting members from the arches on the other tread plate until the relative position of the connecting members and the arches will be substantially as illustrated in Fig. 2 when the axis of the wheel is directly over the center of the plate.

The progressive movement of the wheel rim along the trackways will tend to push any material which may be lodged upon the plate forwardly and crowd it thru the apertures 30 and 31. The material thus pressed thru the apertures 30 and 31 will not only be thus delivered from the upper surface of the plate, but it will be utilized to loosen and break up massed material which may previously have become lodged between the ground gripping flanges, and which, in sticky soils, would otherwise so fill the space between such flanges as to largely destroy their effectiveness. The apertured portions of the plate are, of course, at the top of the spaces between such flanges at the time the pressure is applied by the wheel rim to the material which is being crowded thru the apertures.

I claim:

1. A tread attachment for wheel rims including the combination with a set of connecting members adapted to be secured rigidly to the periphery of the rim and provided with laterally projecting fulcrum portions, of a shoe comprising a rail provided with side flanges having upwardly arched portions spaced to embrace a rim and providing downwardly opening recesses arranged to receive said fulcrum portions.

2. A tread attachment for wheel rims, including the combination with the rim of a set of radially projecting connecting members adapted to be rigidly secured to the outer face of the rim and provided with laterally projecting portions extending inwardly across the margin of the rim and having rounded bearing surfaces, and a tread plate provided with arched members extending over said projecting portions across the respective margins of the rim, said members being adapted to prevent the tread plate from shifting laterally to release the arched portions from the projecting ends of the connecting members, and said arched portions being provided with arcuate bearing surfaces opposed to the rounded bearing surfaces of the connecting members.

3. A tread attachment for wheel rims, including the combination with the rim of a set of connecting members adapted to be rigidly secured to the outer surface of the rim and provided with laterally projecting portions extending inwardly across the rim margin, and having rounded bearing surfaces, a tread plate provided with arched members extending over said projecting portions across the respective margins of the rim, said arched portions being provided with arcuate bearing surfaces opposed to the rounded bearing surfaces of the connecting members, and having substantially the same curvature but supported from the plate at a distance from the bearing surface of the connecting member when the plate is in supported relation to the wheel.

4. A tread attachment for wheel rims, including the combination with the rim of a set of connecting members detachably secured to the outer surface of the rim and provided with laterally projecting portions having rounded bearing surfaces, and a tread plate provided with arched members extending over said projecting portions across the respective margins of the rim, said members being adapted to prevent the tread plate from shifting laterally to release the arched portions from the projecting ends of the connecting members.

5. A tread attachment for wheel rims, including the combination with the rim of a set of connecting members adapted to be rigidly secured to the outer surface of the rim and provided with laterally projecting portions each engaging a rim margin, and having rounded bearing surfaces, and a tread plate provided with arched members extending over said projecting portions across the respective margins of the rim, and in close proximity thereto, said plate having roadgripping flanges on its outer face, and trackways on its inner face in supporting relation to the wheel rim.

6. A tread attachment for wheel rims, including the combination with the rim, of a set of connecting members adapted to be rigidly secured to the outer face of the rim and provided with laterally projecting portions having rounded bearing surfaces, a tread plate provided with arched portions extending over said projecting portions across the respective margins of the rim, said members and arched portions of the plate being adapted to loosely anchor the tread plate to the rim, roadgripping flanges on the outer face of the tread plate, and trackways on its inner face in supporting relation to the wheel rim, said plate being apertured between the trackways and flanges to allow material to be forced thru it in both directions.

7. The combination with a wheel rim having its peripheral surface provided along each margin with a series of connecting members each of which is provided with a bearing portion projecting laterally beyond the rim, tread plates, each connected with the rim by one of the connecting members in each marginal series, each of the tread plates having abutments adapted to bear against the sides of the associated connecting member between the rim margins and provided with means for loosely engaging the projecting bearing portions of the associated connecting members.

8. The combination with a wheel rim having its peripheral surface provided along each margin with a series of connecting members each of which projects radially from said surface, and also laterally beyond the rim, tread plates, each connected with the rim of one of the connecting members in each marginal series, each of the tread plates having abutments adapted to bear against the sides of the associated connecting member between the rim margins, and provided with arched flanges extending across the margin of the rim on each side and loosely embracing the projecting portion of the associated connecting member, each of said plates being also provided with trackways for the rim on the inner surface of the plate, and roadgripping flanges on the outer surface.

9. The combination with a wheel rim having its outer peripheral surface provided along each margin with a series of radially projecting connecting members each of which is provided with a bearing portion projecting laterally beyond the rim, tread plates each connected with the rim by one of the connecting members in each marginal series, each of the tread plates having abutments adapted to bear against the sides of the associated connecting member and provided with arched flanges extending across the margin of the rim and loosely embracing the projecting bearing portion of the connecting member, each of said plates being provided with trackways for the rim and roadgripping flanges on the opposite side of the plate from said trackways, the engagement of said arched flanges with the connecting members being sufficiently loose to allow the plates to conform to the surface of the ground during the initial portion of the movement of the wheel over the plate.

In testimony whereof I affix my signature in the presence of two witnesses.

WILBERT M. BORGAL.

Witnesses:
A. J. McKerihan,
O. C. Weber.